US012011921B2

(12) United States Patent
Yamada

(10) Patent No.: US 12,011,921 B2
(45) Date of Patent: Jun. 18, 2024

(54) LIQUID EJECTION APPARATUS AND CARTRIDGE

(71) Applicant: CANON KABUSHIKI KAISHA, Tokyo (JP)

(72) Inventor: Hiroshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 17/944,729

(22) Filed: Sep. 14, 2022

(65) Prior Publication Data

US 2023/0089266 A1 Mar. 23, 2023

(30) Foreign Application Priority Data

Sep. 17, 2021 (JP) ................................ 2021-152046

(51) Int. Cl.
*B41J 2/175* (2006.01)
*B41J 2/045* (2006.01)

(52) U.S. Cl.
CPC ....... *B41J 2/04505* (2013.01); *B41J 2/04586* (2013.01); *B41J 2/17523* (2013.01); *B41J 2/17566* (2013.01)

(58) Field of Classification Search
CPC .... B41J 2/04505; B41J 2/04586; B41J 2/175; B41J 2/17503; B41J 2/17506; B41J 2/17509; B41J 2/17513; B41J 2/1752; B41J 2/17523; B41J 2/17553; B41J 2/17566; B41J 29/13; B41J 29/38; B41J 2002/17573; B41J 2002/17576
See application file for complete search history.

(56) References Cited

U.S. PATENT DOCUMENTS

| | | | | |
|---|---|---|---|---|
| 10,654,281 | B2 * | 5/2020 | Kobayashi | B41J 2/1755 |
| 2005/0117002 | A1 | 6/2005 | Tsukuda et al. | B41J 2/01 |
| 2009/0179926 | A1 | 7/2009 | Sugahara | B41J 2/195 |
| 2010/0085398 | A1 | 4/2010 | Nakamura | B41J 29/393 |

(Continued)

FOREIGN PATENT DOCUMENTS

| | | |
|---|---|---|
| JP | 2008-087310 | 4/2008 |
| JP | 2010-089336 | 4/2010 |

(Continued)

OTHER PUBLICATIONS

Office Action dated Oct. 3, 2023 in counterpart Japanese Application No. 2021-152046, together with English translation thereof.

(Continued)

*Primary Examiner* — Anh T Vo
(74) *Attorney, Agent, or Firm* — Venable LLP

(57) ABSTRACT

A liquid ejection apparatus includes: a storage chamber which is connectable to a cartridge storing liquid and stores liquid supplied from the cartridge; a movable member provided in the storage chamber and including a float and a detection target portion, the float being lower in specific gravity than the liquid stored in the storage chamber; and a detection unit which detects movement of the movable member by detecting the detection target portion. The detection target portion is movable from a first position to a third position through a second position. The detection unit is arranged to detect the detection target portion in a case where the detection target portion is present at the second position.

15 Claims, 10 Drawing Sheets

(56) References Cited

U.S. PATENT DOCUMENTS

| | | | | |
|---|---|---|---|---|
| 2010/0245410 | A1 | 9/2010 | Kanbe et al. | B41J 29/38 |
| 2010/0245459 | A1* | 9/2010 | Kanbe | B41J 2/1752 347/19 |
| 2011/0267408 | A1* | 11/2011 | Aoi | B41J 2/17523 347/86 |
| 2016/0279953 | A1* | 9/2016 | Hirano | B41J 2/17513 |
| 2018/0215164 | A1 | 8/2018 | Hayashi et al. | B41J 2/17566 |
| 2018/0215166 | A1 | 8/2018 | Tanabe et al. | B41J 2/175 |
| 2019/0030910 | A1 | 1/2019 | Tanabe et al. | B41J 2/175 |
| 2021/0300055 | A1 | 9/2021 | Koshikawa et al. | B41J 2/175 |

FOREIGN PATENT DOCUMENTS

| | | |
|---|---|---|
| JP | 2010-228383 | 10/2010 |
| JP | 2018-122515 | 8/2018 |
| JP | 2018-122516 | 8/2018 |
| JP | 2019-025818 | 2/2019 |

OTHER PUBLICATIONS

Office Action dated Jul. 25, 2023 in counterpart Japanese Application No. 2021-152046, together with English translation thereof.

* cited by examiner

LIQUID EJECTION APPARATUS AND CARTRIDGE

BACKGROUND OF THE INVENTION

Field of the Invention

The present disclosure relates to a liquid ejection apparatus and a cartridge.

Description of the Related Art

As a liquid ejection apparatus, there is known an inkjet printing apparatus comprising an ink storage chamber storing ink and a print head which ejects from a nozzle the ink supplied from the ink storage chamber (Japanese Patent Laid-Open No. 2018-122515; hereinafter referred to as D1). The inkjet printing apparatus disclosed in D1 comprises a pivot member pivotally supported in the ink storage chamber to detect the remaining amount of ink stored in the ink storage chamber. The pivot member comprises a float lower in specific gravity than ink and a detection target portion to be detected by the sensor. In a case where the liquid surface of ink stored in the ink storage chamber is higher than a predetermined height, the pivot member is located at a predetermined position by buoyancy of ink and the detection target portion is detected by the sensor. In a case where the liquid surface of ink stored in the ink storage chamber is equal to or lower than the predetermined height, the pivot member is pivoted by gravity and the detection target portion is not detected by the sensor. The remaining amount of ink stored in the ink storage chamber is thus detected in D1.

However, the technique of D1 can detect only two states of the remaining amount of ink: whether or not the detection target portion is detected by the sensor. Accordingly, a user cannot be provided with detailed information on the remaining amount of ink.

SUMMARY OF THE INVENTION

A liquid ejection apparatus according to an aspect of the present disclosure comprises: a storage chamber connectable to a cartridge storing liquid and configured to store liquid supplied from the cartridge; a movable member provided in the storage chamber and comprising a float and a detection target portion, the float being lower in specific gravity than the liquid stored in the storage chamber; and a detection unit configured to detect movement of the movable member by detecting the detection target portion, wherein the detection target portion is movable from a first position to a third position through a second position, and the detection unit is arranged to detect the detection target portion in a case where the detection target portion is present at the second position.

Further features of the present invention will become apparent from the following description of exemplary embodiments with reference to the attached drawings.

DESCRIPTION OF THE EMBODIMENTS

Embodiments will be hereinafter described with reference to the accompanying drawings. It should be noted that the following embodiments do not limit the present disclosure and that not all combinations of the features described in the embodiments are necessarily essential for solving the problem to be solved by the present disclosure. It should also be noted that the relative positions, shapes, and the like of the constituent elements described in the embodiments are merely shown as examples unless otherwise specified.

First Embodiment

Configuration of Printing Apparatus

In the present embodiment, an inkjet printing apparatus (hereinafter simply referred to as a printing apparatus) which performs printing by ejecting ink (liquid) to a print medium is described as an example of a liquid ejection apparatus.

Figure 1A:
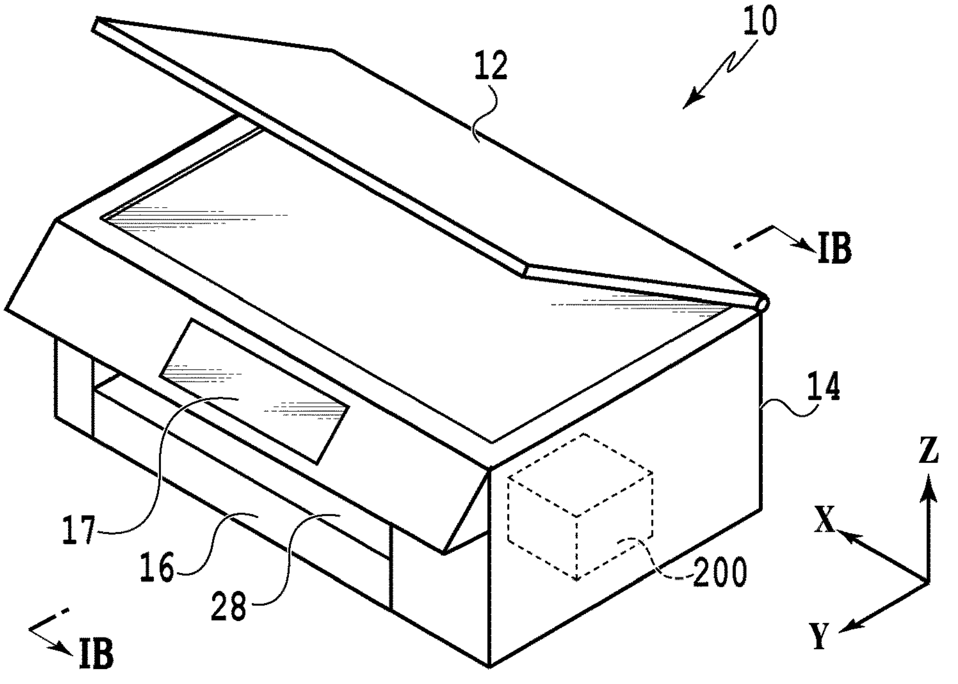
FIGS. 1A and 1B are diagrams schematically illustrating a printing apparatus.
Figure 1B:
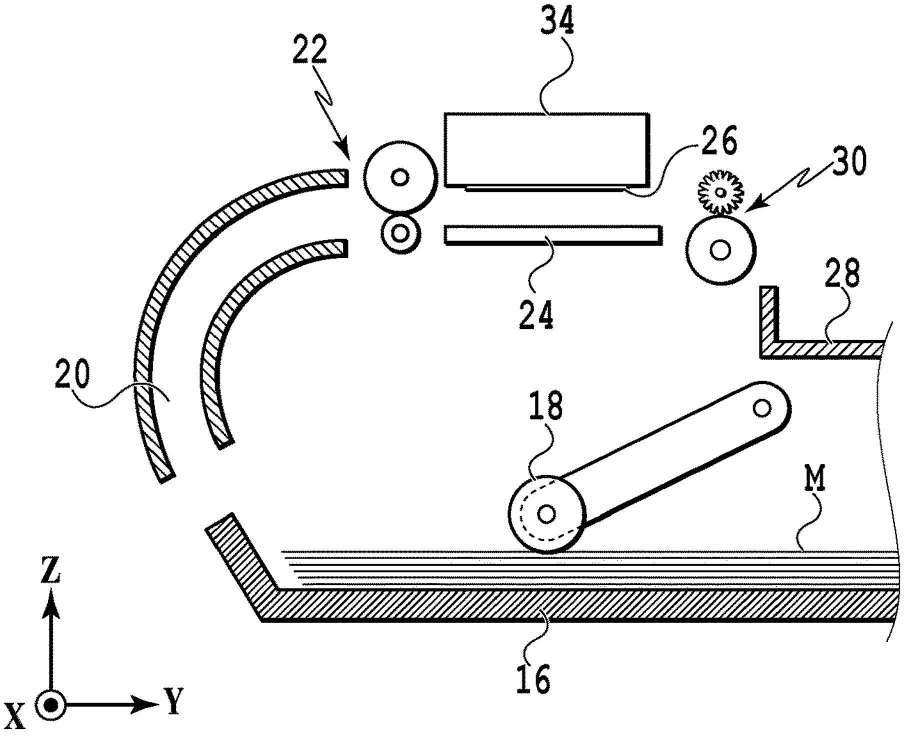

FIGS. 1A and 1B are diagrams schematically illustrating a printing apparatus 10 according to the present embodiment. FIG. 1A is a perspective view of the printing apparatus 10 and FIG. 1B is a cross-sectional view illustrating the configuration of a printing unit 14 of the printing apparatus 10. Incidentally, the printing apparatus shown in FIGS. 1A and 1B is merely an example and the present disclosure is not limited to this aspect.

The printing apparatus 10 shown in FIGS. 1A and 1B is a so-called multifunctional peripheral comprising a reading unit 12 capable of reading a document set on a document plate and the printing unit 14 which performs printing on a print medium based on information read by the reading unit 12, information input from an external apparatus, or the like. A display unit 17 displays various kinds of information on the printing apparatus 10. The reading unit 12 is located at the top of the printing apparatus 10. The printing unit 14 is located at the bottom of the printing apparatus 10.

The printing unit 14 comprises a storage tray 16 which stores a print medium M, a feeding roller 18 which feeds the print medium M stored in the storage tray 16, and a guide unit 20 which guides the fed print medium M to a position of printing by a print head 26. The printing unit 14 also comprises a conveying roller 22 which conveys the print medium M fed through the guide unit 20, a platen 24 which supports the print medium M conveyed by the conveying roller 22, and the print head 26 which ejects ink to the print medium M supported by the platen 24. The printing unit 14 further comprises a discharge roller 30 which discharges the printed print medium M to a discharge tray 28 and an ink storage chamber 200 which stores ink to be supplied to the print head 26 through a tube (not shown).

The print head 26, which is an ejection head, may be configured to eject inks of a plurality of colors or eject only an ink of a single color. Alternatively, the print head 26 may be configured to eject a processing liquid to give a predetermined effect to an image before and after printing. In a case where a plurality of kinds of inks (including a processing liquid) are ejected, a plurality of ink storage chambers 200 are provided to store the different kinds of inks. The print head 26 is mounted on a carriage 34. The carriage 34 is configured to move reciprocally in an X direction. The print medium M stored in the storage tray 16 is conveyed in a −Y direction by the feeding roller 18, turned around by the guide unit 20, and conveyed in a +Y direction by the conveying roller 22.

In the printing apparatus 10, the print head 26 performs a print operation of ejecting ink to the print medium M supported by the platen 24 while moving in the X direction via the carriage 34 to make print corresponding to a single scan on the print medium M. Next, a conveyance operation is performed by conveying the print medium by a predetermined amount in the +Y direction to locate an area of the print medium M on which no print is made at a position facing the print head 26. After that, the print operation is performed again. In this manner, the printing apparatus 10 repeatedly performs the print operation and the conveyance operation, thereby printing a predetermined image on the print medium M.

Incidentally, although a so-called serial type print head 26 which ejects ink to the print medium M while moving the carriage 34 reciprocally in the X direction is described as an example in the present embodiment, the print head is not limited to this example. For example, the printing apparatus may use a so-called line head type print head with ejection openings formed to cover the width direction of the print medium M.

Block Diagram

Figure 2:
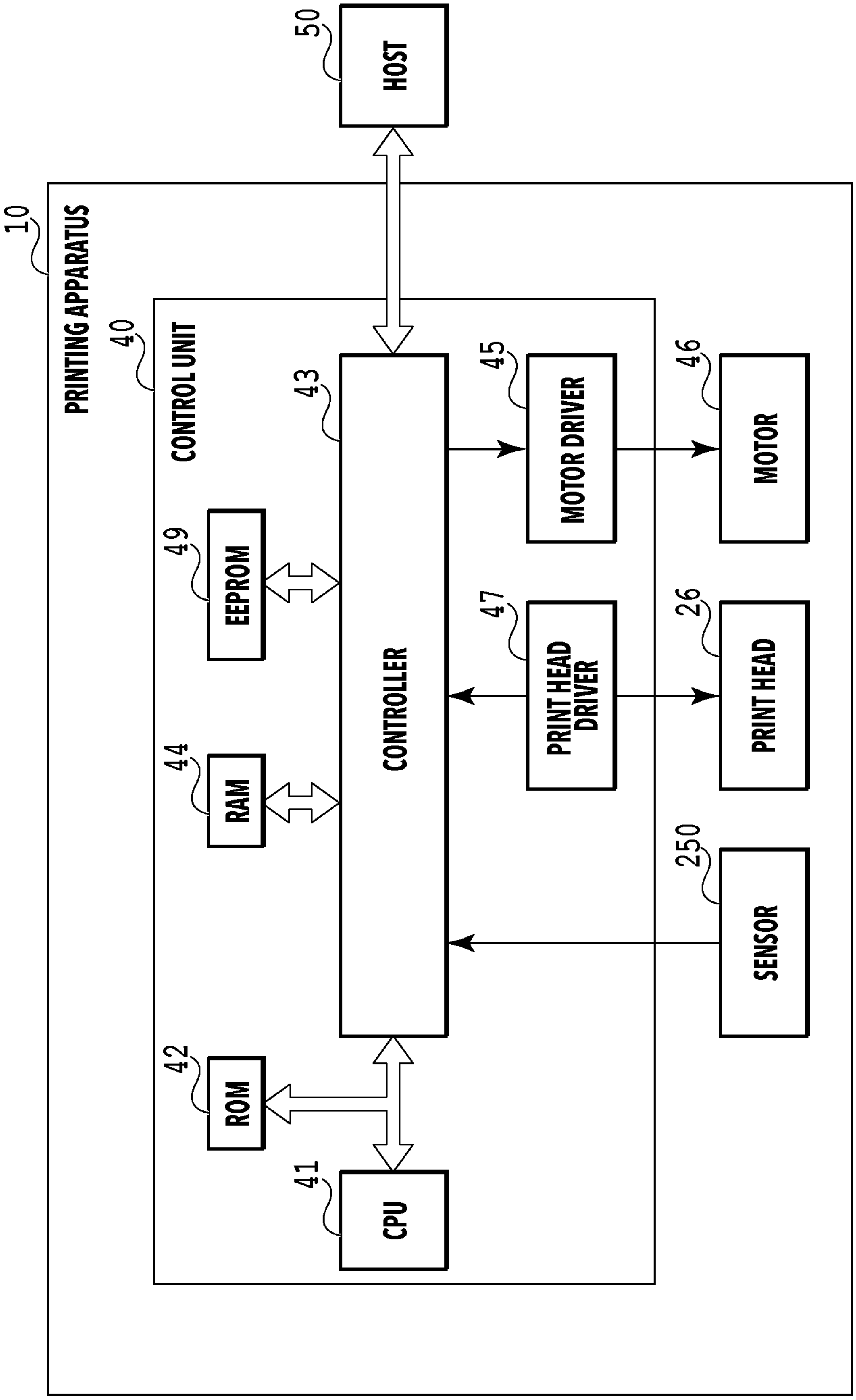
FIG. 2 is a block diagram showing a schematic configuration of the printing apparatus.

FIG. 2 is a block diagram showing a schematic configuration of the printing apparatus 10. As shown in FIG. 2, the printing apparatus 10 comprises a control unit 40, the print head 26, a motor 46, and a sensor 250. The printing apparatus 10 is configured to communicate with a host 50 such as a computer, smartphone, or tablet. The control unit 40 comprises a CPU 41, a ROM 42, a controller 43, a RAM 44, a motor driver 45, a print head driver 47, and an EEPROM 49.

The CPU (central processing unit) 41 controls various mechanisms in the printing apparatus 10 via the controller 43 according to various programs stored in the ROM 42. The ROM 42 stores various programs. The RAM 44 is used as a work area for temporary storage of various kinds of data and execution of processing. The CPU 41 performs image processing to convert image data received from the host 50 into a print signal printable by the printing apparatus 10. The CPU 41 prints an image on a print medium by driving the print head 26 via the print head driver 47 while driving the motor 46 for rotational driving of various rollers via the motor driver 45 based on information subjected to image processing or the like. Incidentally, in FIG. 2, various motors in the printing apparatus 10 are shown as the motor 46 and motor drivers for driving the respective motors are shown as the motor driver 45 for ease of understanding. The control unit 40 comprises the electrically writable EEPROM 49. The EEPROM 49 stores various setting values or data to be updated. The data stored in the EEPROM 49 is used as control parameters by the controller 43 or the CPU 41. The sensor 250 is used to detect the remaining amount in the ink storage chamber 200 as will be described later.

Incidentally, FIG. 2 only shows a schematic configuration and other constituents may be included. In addition, although FIG. 2 shows an example in which the printing apparatus 10 and the host 50 are separate, the host 50 may be incorporated into the printing apparatus 10.

Ink Cartridge and Ink Storage Chamber

Figure 3:
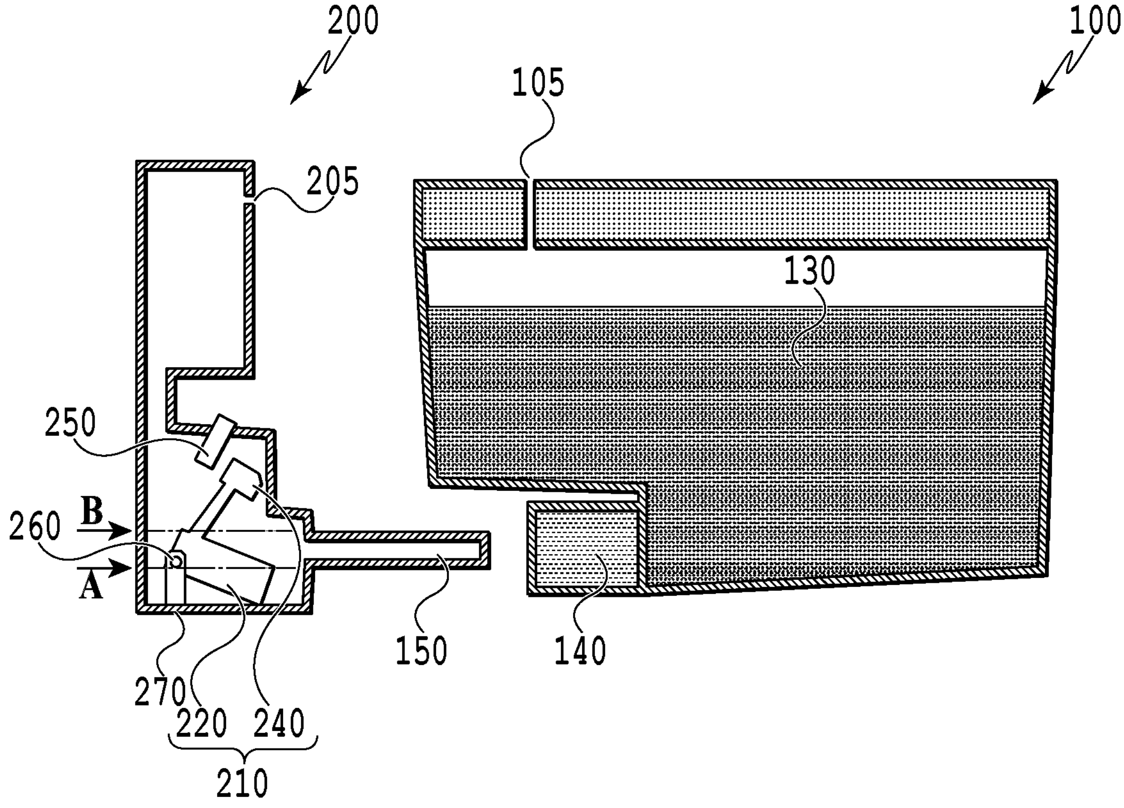
FIG. 3 is a diagram showing an ink cartridge and an ink storage chamber.
Figure 4:
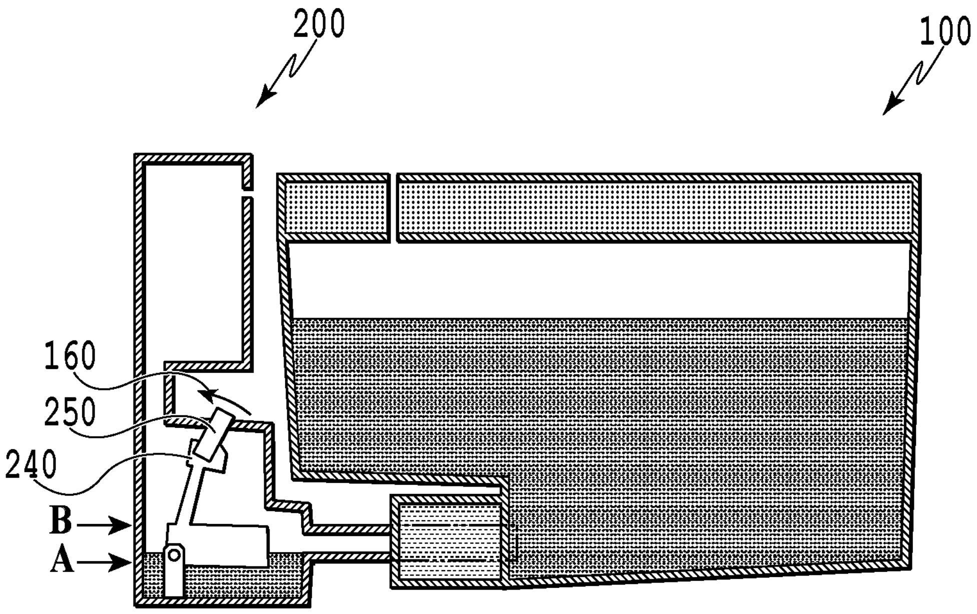
FIG. 4 is a diagram showing a state where the ink storage chamber begins to be filled with ink.
Figure 5:
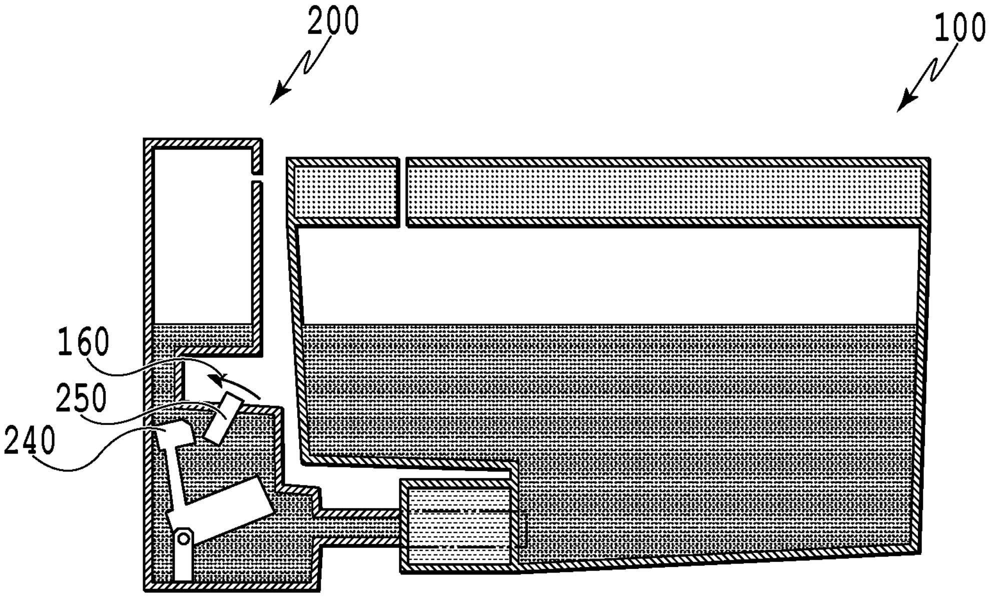
FIG. 5 is a diagram showing a state where the ink storage chamber is completely filled with ink.
Figure 6:
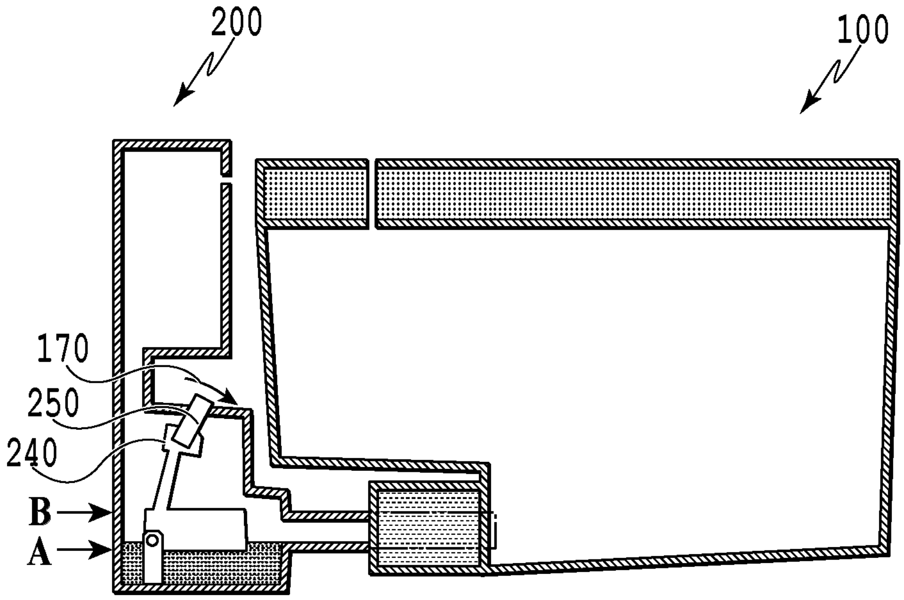
FIG. 6 is a diagram showing a state where the remaining amount of ink decreases in the ink storage chamber.
Figure 7:
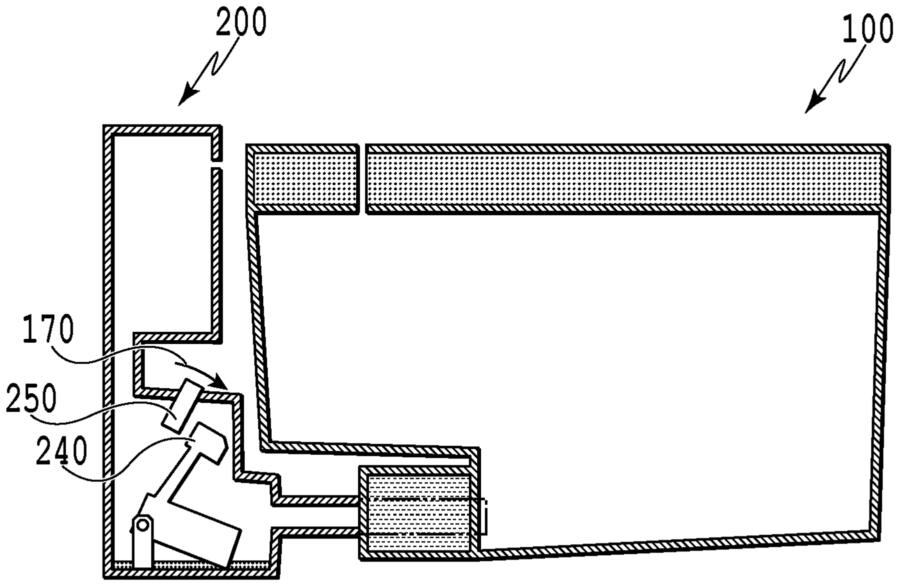
FIG. 7 is a diagram showing a state where almost no ink remains in the ink storage chamber.

FIG. 3 is a diagram showing an ink cartridge 100 and the ink storage chamber 200 according to the present embodiment. FIG. 3 shows a set of the ink cartridge 100 and the ink storage chamber 200 corresponding to a single color. FIG. 4 is a diagram showing a state where the ink cartridge 100 and the ink storage chamber 200 are connected to each other and the ink storage chamber 200 begins to be filled with ink. FIG. 5 is a diagram showing a state where ink is further injected as compared to the state of FIG. 4 and the ink storage chamber 200 is completely filled with ink. FIG. 6 is a diagram showing a state where the ink cartridge 100 has no ink and the remaining amount of ink decreases in the ink storage chamber 200. FIG. 7 shows a state where ink is further used as compared to the state of FIG. 6 and almost no ink remains in the ink storage chamber 200. The ink cartridge 100 and the ink storage chamber 200 will be described below with reference to FIG. 3 mainly and FIG. 3 to FIG. 7 as appropriate.

The ink cartridge 100 is a container storing ink 130 and comprises an air communication port 105 and an ink supply portion 140. The ink cartridge 100 and the ink storage chamber 200 are connectable to each other. The ink storage chamber 200 is supplied with the ink 130 by connecting the ink supply portion 140 of the ink cartridge 100 to the ink storage chamber 200 (see FIG. 4).

The ink storage chamber 200 provided in the printing apparatus 10 is equipped with a connection needle 150 to be connected to the ink supply portion 140 of the ink cartridge 100. The ink 130 in the ink cartridge 100 flows into the ink storage chamber 200 through the connection needle 150. The ink stored in the ink storage chamber 200 is supplied to the print head 26, for example, from an outlet (not shown) provided in a bottom surface 270 of the ink storage chamber 200 through an ink tube (not shown). The ink storage chamber 200 also comprises an air communication port 205.

The ink storage chamber 200 comprises a pivot member 210 pivotally supported therein. The ink storage chamber 200 also comprises the sensor 250 to detect the remaining amount of ink in the ink storage chamber.

Pivot Member

The pivot member 210 comprises a float 220 lower in specific gravity than the ink 130 and a detection target portion 240 to be detected by the sensor 250. In a case where a liquid surface of ink stored in the ink storage chamber 200 exceeds a predetermined height (e.g., a height A in FIG. 3), the pivot member 210 pivots in a direction 160 in FIG. 4 by buoyancy of ink. In contrast, in a case where the liquid surface of ink stored in the ink storage chamber 200 falls below a predetermined height (e.g., a height B in FIG. 3), the pivot member 210 pivots in a direction 170 in FIG. 6 by gravity. This pivot motion of the pivot member 210 moves the detection target portion 240 provided at the upper end of the pivot member 210. The motion of the detection target portion 240 is detected by the sensor 250. As a result, the remaining amount of ink stored in the ink storage chamber 200 is detected. In the present embodiment, the sensor 250 is provided at a position corresponding to about the midpoint of the range of pivot motion of the pivot member 210 as will be described later. Accordingly, the remaining amount of ink in the ink storage chamber 200 can be detected in there levels. The details will be described later.

The pivot member 210 of the present embodiment pivots about a pivot shaft 260 provided in a position extended upward from the bottom surface 270 of the ink storage chamber 200. The detection target portion 240 is provided in a direction intersecting with the direction of extension (axial direction) of the pivot shaft 260. The bottom surface 270 of the ink storage chamber 200 and the pivot shaft 260 are at a distance greater than a predetermined value from each other, thereby expanding the range of pivot motion of the pivot member 210 and the range of motion of the detection target portion 240. This makes it easy to arrange the sensor 250 at the position corresponding to the midpoint of the range of motion of the detection target portion 240. The height position of the pivot shaft 260 should preferably be substantially equal to the position of the hole of the connection needle 150 but may be any position as long as it is above the bottom surface 270 of the ink storage chamber 200. Further, the height of the pivot shaft 260 does not necessarily have to be above the bottom surface 270 provided that the detection target portion 240 can be detected by the sensor 250 provided at about the midpoint position of the range of pivot motion of the pivot member 210. In the present embodiment, the height position of the pivot shaft 260 is set at such a position that the float 220 can move downward below the pivot shaft 260 toward the bottom surface of the ink storage chamber 200.

Sensor

The sensor 250 of the present embodiment performs optical detection. That is, the sensor 250 comprises a light emitting portion and a light receiving portion (not shown). The light emitting portion and the light receiving portion are arranged at an interval in the front and the back in FIG. 3. The sensor 250 outputs different detection signals according to whether light output from the light emitting portion is received by the light receiving portion. For example, the sensor 250 outputs a low-level signal to the control unit 40 on the condition that light output from the light emitting portion cannot be received by the light receiving portion (i.e., a received light intensity is less than a predetermined intensity). Incidentally, the low-level signal indicates a signal having a signal level less than a threshold level. In contrast, the sensor 250 outputs a high-level signal to the control unit 40 on the condition that light output from the light emitting portion is received by the light receiving portion (i.e., a received light intensity is equal to or greater than a predetermined intensity). The high-level signal indicates a signal having a signal level equal to or greater than a threshold level.

Ink Injection

FIG. 3, which has been described above, shows the printing apparatus 10 (ink storage chamber 200) at the time of factory shipment. In a case where the ink cartridge 100 and the ink storage chamber 200 are connected to each other in the state of FIG. 3, the state transitions to the state shown in FIG. 5 through the state shown in FIG. 4.

As shown in FIG. 3, in the printing apparatus 10 at the time of factory shipment, the ink storage chamber 200 is empty of ink. The liquid surface of ink is naturally lower than the predetermined height A. Thus, the detection target portion 240 is at a position deviated from between the light emitting portion and light receiving portion of the sensor 250; this position is referred to as a first position. In this state, in the sensor 250, light output from the light emitting portion can be received by the light receiving portion (or can reach the light receiving portion without attenuation). Accordingly, the sensor 250 outputs a high-level signal to the control unit 40.

The control unit 40 stores a current status of the printing apparatus 10 (e.g., factory shipment) in a memory (such as the EEPROM 49). The control unit 40 can grasp the remaining amount of ink in three levels based on the status of the printing apparatus 10 and the signal level from the sensor 250.

Figure 8:
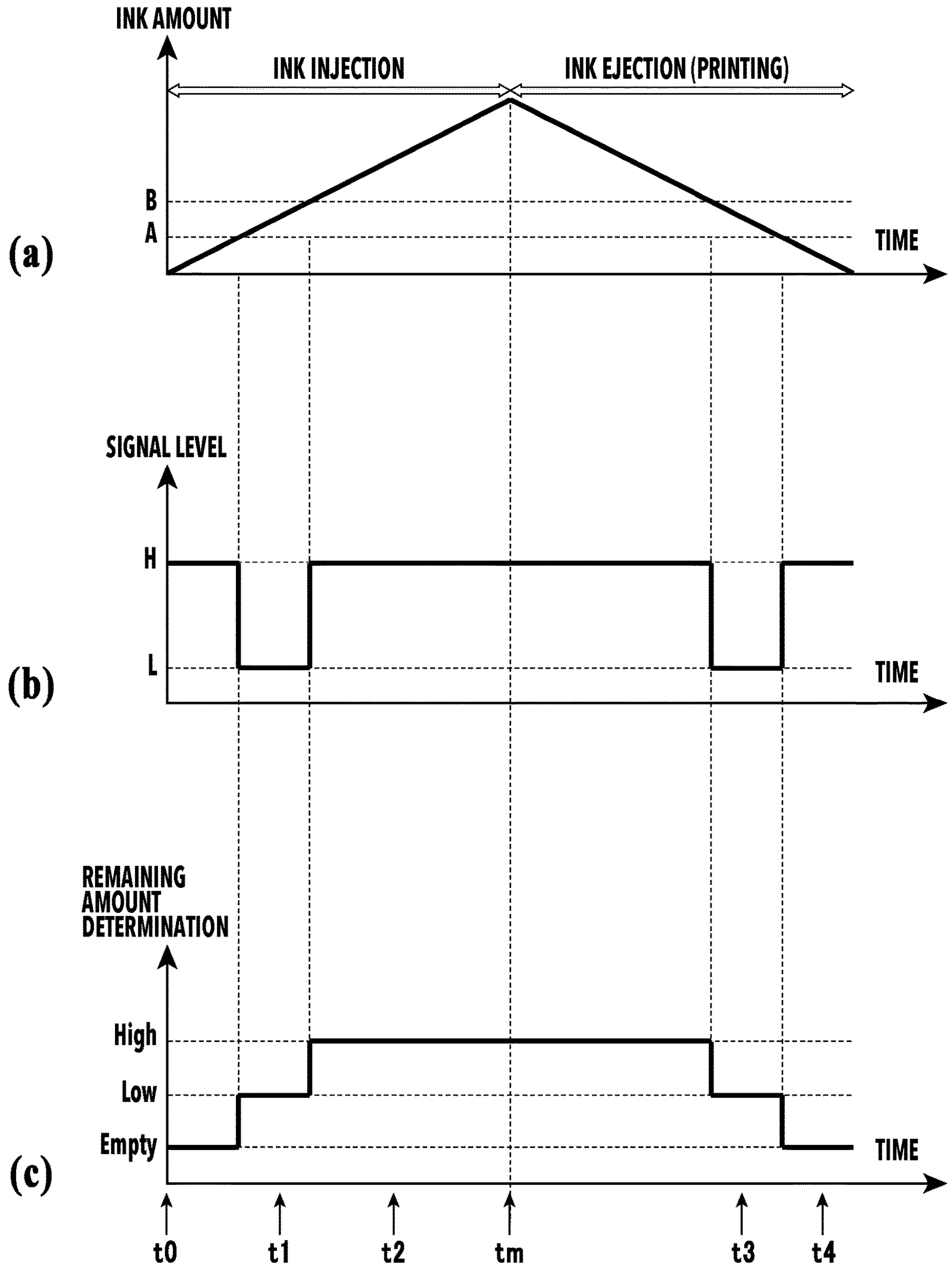
FIG. 8 is a diagram showing a signal level from the sensor and a result of ink remaining amount determination.

FIG. 8 is a diagram showing the signal level from the sensor 250, the amount of ink in the ink storage chamber 200, and a result of ink remaining amount determination performed by the control unit 40. FIG. 8 (*a*) shows the amount of ink in the ink storage chamber 200. FIG. 8 (*b*) shows the signal level from the sensor 250. FIG. 8 (*c*) shows a result of ink remaining amount determination performed by the control unit 40. In FIG. 8, the horizontal axis indicates time and shows a common time axis for FIG. 8. A description will be given below with reference to FIG. 8 as appropriate.

In the printing apparatus 10 at the time of factory shipment as shown in FIG. 3, the control unit 40 outputs a determination that the ink liquid surface is lower than the predetermined height A (e.g., Empty) as an initial setting at the time of factory shipment (t0 in FIG. 8). More specifically, the control unit 40 determines that the amount of ink in the ink storage chamber 200 is Empty (first level) on the basis that the status of the printing apparatus 10 indicates factory shipment and that the signal from the sensor 250 is a high-level signal. Incidentally, the control unit 40 can display the determination output result on, for example, the display unit 17 of the printing apparatus 10 to provide a user with ink remaining amount information.

Next, a description will be given of a case where a user connects the ink cartridge 100 to the ink storage chamber 200 and fill the ink storage chamber 200 with the ink 130 as shown in FIG. 4. In a case where the ink cartridge 100 and the ink storage chamber 200 are connected to each other via the ink supply portion 140 and the connection needle 150 as shown in FIG. 4, the ink 130 in the ink cartridge 100 flows into the ink storage chamber 200. The incoming ink causes the buoyancy acting on the float 220 to exceed the gravity, whereby the pivot member 210 begins pivoting in the direction 160. In a case where the liquid surface in the ink storage chamber 200 becomes equal to or higher than the predetermined height A, the detection target portion 240 is positioned between the light emitting portion and the light receiving portion of the sensor 250; this position is referred to as a second position. Since the interval between the light emitting portion and the light receiving portion is shielded by the detection target portion 240, light output from the light emitting portion cannot be received by the light receiving portion (or reaches the light receiving portion after being attenuated). Thus, the sensor 250 outputs a low-level signal to the control unit 40. In response to a signal change of the sensor output from the high level to the low level, the control unit 40 outputs a determination that the ink liquid surface is equal to or higher than the predetermined height A and lower than the predetermined height B (e.g., Low) (t1 in FIG. 8). That is, the control unit 40 determines that the amount of ink in the ink storage chamber 200 is Low (second level) and displays the determination output result on the display unit 17 or the like. Incidentally, the predetermined height B is higher than the predetermined height A.

Next, in a case where the ink 130 in the ink cartridge 100 further continues flowing into the ink storage chamber 200 as shown in FIG. 5, the pivot member 210 continues pivoting in the direction 160. In a case where the liquid surface in the ink storage chamber 200 becomes equal to or higher than the predetermined height B as shown in FIG. 5, the detection target portion 240 pivots again to a position deviated from between the light emitting portion and the light receiving portion of the sensor 250; this position is referred to as a third position. Since the shielding by the detection target portion 240 is removed at the third position, the sensor 250 outputs a high-level signal to the control unit 40. In response to a signal change of the sensor output from the low level to the high level, the control unit 40 outputs a determination that the ink liquid surface is equal to or higher than the predetermined height B (e.g., High) (t2 in FIG. 8). That is, the control unit 40 determines that the amount of ink in the ink storage chamber 200 is High (third level) and displays the determination output result on the display unit 17 or the like.

As described above, since the sensor 250 is positioned at about the midpoint of the range of pivot motion (range of motion) of the detection target portion 240, the control unit 40 can specify that the detection target portion 240 is located at the third position after passing from the first position through the second position.

Incidentally, in the above example, the display output is produced to the display unit 17 or the like in the case of a change of the amount of ink in the ink storage chamber 200. However, the display output may be produced but does not have to be produced. For example, it is not necessary to produce the display output of the amount of ink in a case where the amount of ink is High (third level).

Ink Ejection

Next, a description will be given of the case of ejecting ink through the print head 26 in a state where the ink liquid surface is equal to or higher than the predetermined height B (e.g., the state of FIG. 5). Ink is supplied from the ink storage chamber 200 to the print head 26 through the outlet, which lowers the liquid surface of ink in the ink cartridge 100 and the ink storage chamber 200. Accordingly, as shown in FIG. 6, the liquid surface in the ink storage chamber 200 falls below the predetermined height B. In this state, the buoyancy acting on the float 220 of the pivot member 210 decreases and the gravity exceeds the buoyancy. As a result, the pivot member 210 pivots in the direction 170 and the detection target portion 240 moves to the position between the light emitting portion and the light receiving portion of the sensor 250. Since the light emitting portion and the light receiving portion are shielded by the detection target portion 240, the sensor 250 outputs a low-level signal to the control unit 40.

After ink injection, the printing apparatus 10 is in an ink-filled status. This ink-filled status is stored in the EEPROM 49. The storage of the ink-filled status in the EEPROM 49 may be triggered by a predetermined user operation after ink injection. Alternatively, the storage of the ink-filled status in the EEPROM 49 may be triggered by detection of a signal change of the signal level from the high level at the time of factory shipment as the initial status to the low level and a signal change from the low level to the high level. Any other methods may be used to store the ink-filled status in the EEPROM 49.

In the case of receiving the low-level signal, the control unit 40 outputs a determination that the ink liquid surface is lower than the predetermined height B and equal to or higher than the predetermined height A (e.g., Low) in response to a signal change of the sensor output from the high level to the low level at the time of ink ejection (t3 in FIG. 8). For example, at t3, the display unit 17 of the printing apparatus 10 makes a display to prompt a user to prepare for replacement with a new ink cartridge.

An apparatus which detects the amount of ink in the ink storage chamber 200 in two levels like D1 has no choice but to make an ink cartridge replacement display with almost no ink remaining in the ink storage chamber 200. Thus, there is no time to prepare a new ink cartridge. Further, depending on a state of use by a user, there is a possibility that the ink storage chamber 200 is left empty of ink and the ink remaining in the ink storage chamber 200 is thickened and finally solidified to cause an operation failure. In contrast, in the printing apparatus 10 according to the present embodiment, a user can be prompted to start preparing a new ink cartridge with some ink remaining in the ink storage chamber 200.

As the ink continues to be ejected from the print head 26 from the state of FIG. 6, the liquid surface of the ink storage chamber 200 becomes lower. Accordingly, as shown in FIG. 7, the pivot member 210 continues pivoting in the direction 170 and the detection target portion 240 pivots to the position deviated from between the light emitting portion and the light receiving portion of the sensor 250. Since the shielding by the detection target portion 240 is removed, the sensor 250 outputs a high-level signal to the control unit 40. In the case of receiving the signal, the control unit 40 outputs a determination that the ink liquid surface is lower than the predetermined height A (e.g., Empty) in response to a signal change of the sensor output from the low level to the high level at the time of ink ejection (t4 in FIG. 8).

At t4 in FIG. 8, a display to prompt a user to make replacement with a new ink cartridge is output to the display unit 17 of the printing apparatus 10. Since the display has been already made to prompt preparation for replacement at the immediately preceding stage t3, there is time to prepare a new ink cartridge at t4. Thus, there is a high probability that a user is ready to replace the ink cartridge. Accordingly, the possibility of an operation failure or the like caused by ink solidification as described above can be reduced.

Incidentally, an interval of ink remaining amount determination can be changed by changing the width of the detection target portion 240 in the moving direction of the detection target portion 240. For example, in a case where the width of the detection target portion 240 is greater (longer) than that shown in FIG. 3, a period during which the detection target portion 240 is detected by the sensor 250 becomes long. That is, since a long period during which the above ink remaining amount determination is Low can be ensured, a user can have a long time to prepare for replacement with a new ink cartridge. However, if the width of the detection target portion 240 is greater than the range of motion of the detection target portion 240, the detection target portion 240 always stays between the light emitting portion and the light receiving portion of the sensor 250. Accordingly, it is preferable that the width of the detection target portion 240 be less than the range of motion in the moving direction of the detection target portion 240.

The present embodiment shows the example of detecting the remaining amount of ink by the pivot motion of the pivot member, but the disclosure is not limited to this. For example, the remaining amount of ink may be detected by movement of a floating object (not shown) on the ink liquid surface. The floating object is also a kind of float lower in specific gravity than the ink 130. The floating object is stored in the ink storage chamber 200 and moves vertically according to the remaining amount of ink, namely the liquid surface. The position of the floating object may be detected by the sensor 250. That is, the floating object functions as both of the float and the detection target portion. By arranging the sensor 250 at a position corresponding to the midpoint of the range of motion of the floating object, the remaining amount of ink can be detected in three levels. In this manner, a floating body such as the floating object per se may be used as a movable member that moves in a predetermined direction instead of the pivot member. The remaining amount of ink may be detected in three levels by the sensor 250 detecting the movement of the movable member.

The present embodiment shows the example in which the initial status of the inkjet printing apparatus is a factory shipment status and the amount of ink is detected in three levels according to a change of the signal level of the sensor 250, but the disclosure is not limited to this. For example, although the sensor 250 detects the signal level while the power is supplied, even in a case where initial injection is performed while the power is not supplied, if the filled status is then stored in the EEPROM 49 by a user instruction or the like, the status may be used for processing. That is, although the present embodiment explains the determination by the control unit 40 relative to time t0 of factory shipment in FIG. 8, the determination may be performed by the control unit 40 relative to time tm. In a case where the ink cartridge is replaced and ink is injected again, the determination by the control unit 40 shown in FIG. 8 is also performed again.

As described above, according to the present embodiment, the remaining amount of ink can be detected in detail without increasing the number of sensors. That is, according to the present embodiment, the remaining amount of ink stored in the ink storage chamber 200 can be detected in three levels. Therefore, a user can be provided with the detailed information on the remaining amount of ink.

Second Embodiment

The first embodiment has shown the example in which the pivot member 210 is provided in the ink storage chamber 200 of the printing apparatus 10 to detect the amount of ink in the ink storage chamber 200. The present embodiment will explain an example in which the pivot member 210 is provided in the ink cartridge 100 to detect the amount of ink in the ink cartridge 100.

Figure 9:
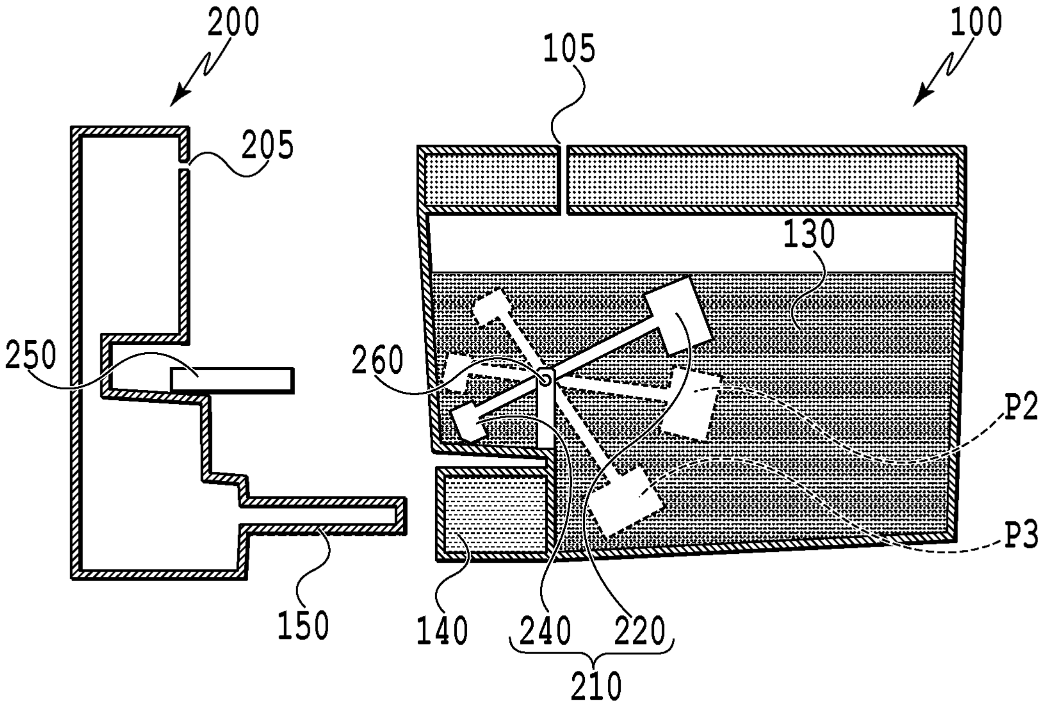
FIG. 9 is a diagram showing the ink cartridge and the ink storage chamber.

FIG. 9 is a diagram showing the ink cartridge 100 and the ink storage chamber 200 according to the present embodiment. Like FIG. 3, FIG. 9 shows a set of the ink cartridge 100 and the ink storage chamber 200 corresponding to a single color.

The pivot member is not provided in the ink storage chamber 200. The sensor 250 is provided outside the ink storage chamber 200 to detect the detection target portion 240 in the ink cartridge 100 in a case where the ink cartridge 100 is connected.

The ink cartridge 100 comprises the pivot member 210 pivotally supported in the ink cartridge. Like the first embodiment, the pivot member 210 comprises the float 220 lower in specific gravity than the ink 130 and the detection target portion 240 to be detected by the sensor 250. The pivot member 210 pivots according to the height of the ink liquid surface in the ink cartridge 100 and the detection target portion 240 also moves accordingly. The position of the pivot member 210 shown by solid lines in FIG. 9 indicates a state where the liquid in the ink cartridge 100 is High as shown in FIG. 9. In FIG. 9, the pivot member 210 at a position P2 shown by dashed lines indicates a Low state and the pivot member 210 at a position P3 shown by dashed lines indicates an Empty state.

Figure 10:
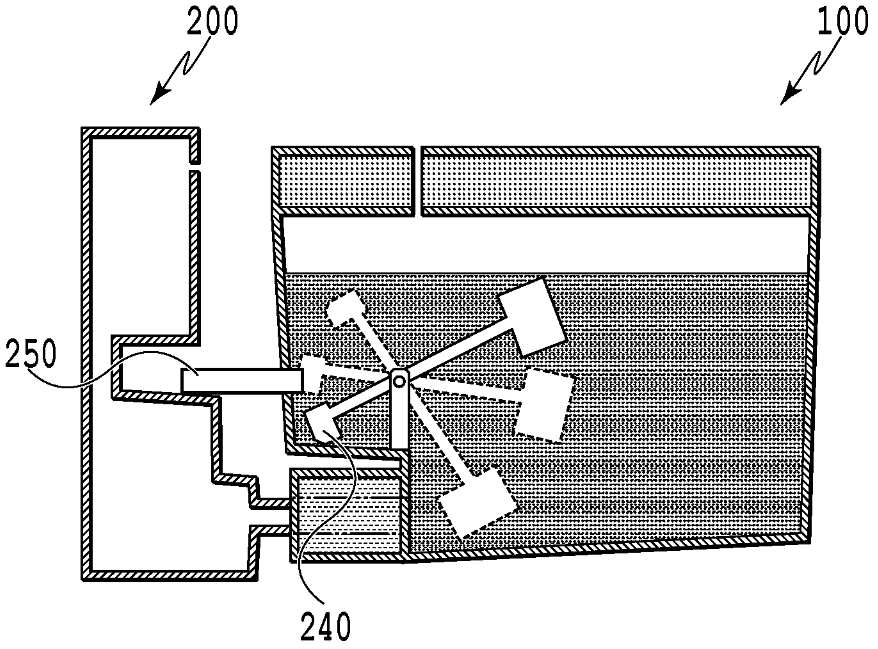
FIG. 10 is a diagram showing a state where the ink cartridge and the ink storage chamber are connected to each other.

FIG. 10 is a diagram showing a state in which the ink cartridge 100 and the ink storage chamber 200 are connected to each other. As shown in FIG. 10, the ink storage chamber 200 has the sensor 250 arranged at a position corresponding to the midpoint of the range of motion of the detection target portion 240 in a case where the ink cartridge 100 is connected to the ink storage chamber 200. The use of the above configuration enables detection of the remaining amount of ink in three levels like the example described in the first embodiment.

As described above, according to the present embodiment, the remaining amount of ink can be detected in detail without increasing the number of sensors. That is, according to the present embodiment, the remaining amount of ink stored in the ink cartridge 100 can be detected in three levels. Therefore, a user can be provided with the detailed information on the remaining amount of ink.

Incidentally, although the pivot member 210 is shown as an example in the present embodiment, the floating object may also be used as described in the first embodiment.

Other Embodiments

The first embodiment and the second embodiment described above may be combined with each other. More specifically, the pivot members may be provided in the ink storage chamber 200 and the ink cartridge 100, respectively, to detect the remaining amounts of ink in both of them.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-152046, filed Sep. 17, 2021, which is hereby incorporated by reference wherein in its entirety.

What is claimed is:

1. A liquid ejection apparatus comprising:

a storage chamber connectable to a cartridge storing liquid and configured to store liquid supplied from the cartridge;

a movable member provided in the storage chamber and comprising a float and a detection target portion, the float being lower in specific gravity than the liquid stored in the storage chamber; and a detection unit configured to detect movement of the movable member by detecting the detection target portion, wherein the detection target portion is movable from a first position to a third position through a second position, and the detection unit is arranged to detect the detection target portion in a case where the detection target portion is present at the second position.

2. The liquid ejection apparatus according to claim 1, wherein the detection target portion is movable within a range from the first position to the third position, and a width of the detection target portion in a direction of movement of the detection target portion is less than the range.

3. The liquid ejection apparatus according to claim 1, wherein the movable member is a pivot member which pivots about a shaft and the detection target portion extends in a direction intersecting with a direction of extension of the shaft.

4. The liquid ejection apparatus according to claim 3, wherein the shaft is a predetermined height away from a bottom surface of the storage chamber.

5. The liquid ejection apparatus according to claim 4, wherein the predetermined height is such a height that the float is movable downward below the shaft toward the bottom surface of the storage chamber.

6. The liquid ejection apparatus according to claim 1, wherein the detection unit is configured to output a signal of a level differing according to whether or not the detection target portion is detected, and the liquid ejection apparatus further comprises a control unit configured to determine a position of the detection target portion according to a change of output from the detection unit.

7. The liquid ejection apparatus according to claim 6, wherein the control unit determines the position of the detection target portion in three levels.

8. The liquid ejection apparatus according to claim 1, wherein the detection unit is configured to output a signal of a level differing according to whether or not the detection target portion is detected, and the liquid ejection apparatus further comprises a control unit configured to determine a remaining amount of liquid stored in the storage chamber according to a change of output from the detection unit.

9. The liquid ejection apparatus according to claim 8, wherein the control unit determines the remaining amount of liquid in three levels.

10. The liquid ejection apparatus according to claim 6, further comprising a display unit configured to display a result of determination by the control unit.

11. A cartridge connectable to a storage chamber provided in a liquid ejection apparatus for ejecting liquid, the cartridge storing liquid to be supplied to the storage chamber, the cartridge comprising a movable member, the movable member being provided in the cartridge and comprising a float and a detection target portion, the float being lower in specific gravity than the liquid stored in the cartridge, wherein the detection target portion is movable from a first position to a third position through a second position, and the cartridge is connected to the storage chamber such that the detection target portion is detected by a detection unit provided outside the storage chamber in a case where the detection target portion is present at the second position.

12. The cartridge according to claim 11, wherein the detection target portion is movable within a range from the first position to the third position, and a width of the detection target portion in a direction of movement of the detection target portion is less than the range.

13. The cartridge according to claim 11, wherein the movable member is a pivot member which pivots about a shaft and the detection target portion extends in a direction intersecting with a direction of extension of the shaft.

14. The cartridge according to claim 13, wherein the shaft is a predetermined height away from a bottom surface of the cartridge.

15. The cartridge according to claim 14, wherein the predetermined height is such a height that the float is movable downward below the shaft toward the bottom surface of the cartridge.

* * * * *